Aug. 31, 1943.   J. M. ROPER   2,328,032
AIRPLANE RUNNING LIGHT INSTALLATION
Filed June 11, 1942
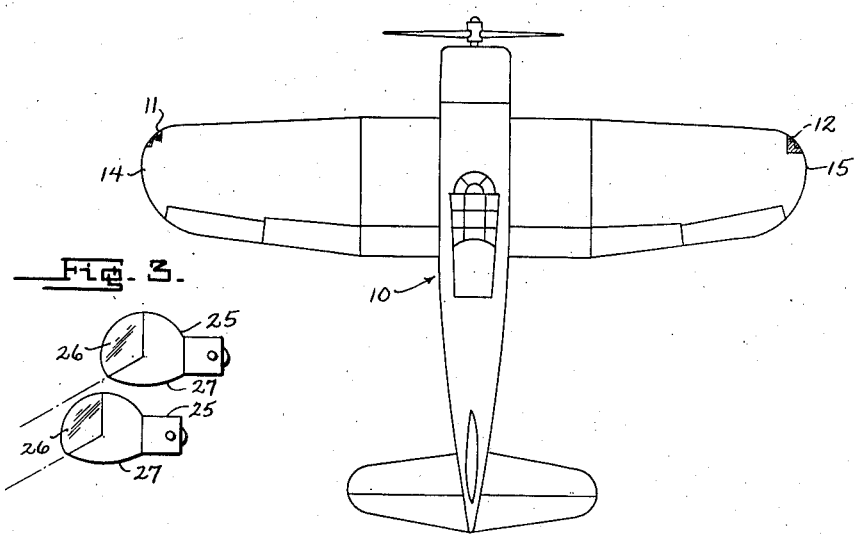
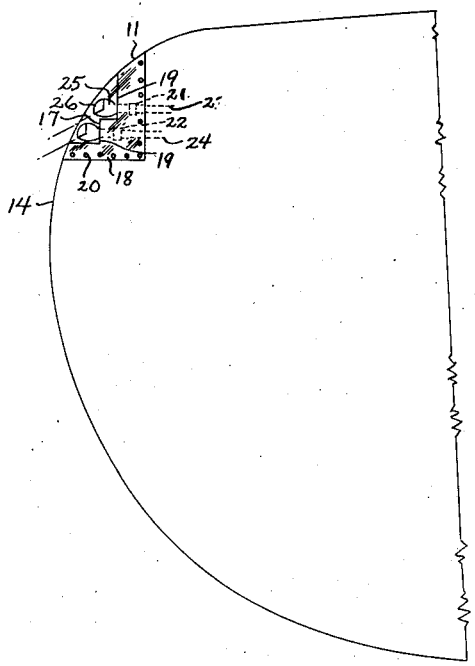
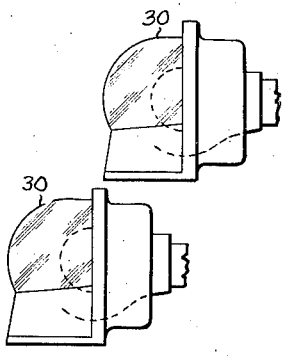
INVENTOR
John M. Roper
BY
ATTORNEY Patented Aug. 31, 1943

2,328,032

UNITED STATES PATENT OFFICE 2,328,032

AIRPLANE RUNNING LIGHT INSTALLATION

John M. Roper, Washington, D. C.

Application June 11, 1942, Serial No. 446,616

1 Claim. (Cl. 240—7.7)

(Granted under the act of March 3, 1883, as amended April 30, 1928; 370 O. G. 757)

This invention relates to running lights and particularly their installation on aircraft, and has for an object to provide a high degree of running light illumination on aircraft, particularly aircraft of the extremely streamlined high speed type which have comparatively thin wing tips. Such extremely thin wing tips made it extremely difficult to provide sufficient illumination prior to the present invention.

A further object of this invention is to provide a running light installation particularly adapted for extremely thin wing tips, whereby an ample amount of illumination can be provided, more than sufficient to comply with all safety regulations and which, in addition, provides a factor of safety in case of the failure of any individual lamp.

A further object of this invention is to provide a running light installation at the outer wing tips of an aircraft, which installation includes at least two or more individual running light lamps in staggered relation to each other, wherein each individual lamp provides illumination complying with all regulations and each lamp supplements the other lamp to increase the illumination so necessary in view of the high speeds at which aircraft now travels.

Still a further object of this invention is to provide running light installation for aircraft wherein the lamps themselves are made of glass having the desired red or green coloring therein, thereby insuring a maximum illumination of the proper signal color.

Still a further object of this invention is to provide a running light installation consisting of a plurality of individual colored lamps in staggered relation to each other located within a transparent cover faired into the wing tip so as to avoid any disturbance whatsoever to the streamlining and efficiency of the wing.

With the foregoing and other objects in view, the invention consists in the construction, combination and arrangement of the parts hereinafter described and illustrated in the drawing, in which:

Fig. 1 is a plan view of an aircraft to which this invention has been applied.

Fig. 2 is an enlarged detail view of a wing tip of the aircraft of Fig. 1.

Fig. 3 is a detail view of a pair of the preferred type of lamps shown in the staggered relation in which they are mounted in the aircraft; and Fig. 4 is a view similar to Fig. 3 of another conventional type of lamp.

There is shown at 10 an aircraft having running light installations 11 and 12 at the port and starboard wing tips 14 and 15 thereof, the port light 11 emitting a red signal while the starboard installation 12 emits a green signal. Inasmuch as each of the installations 11 and 12 are identical except for the color of the signal emitted, the following description of the port installation, except for the color, applies equally to the starboard installation.

The running light installation 11 as shown is mounted in the outer forward wing tip 14 of the aircraft 10 and consists of a plurality of staggered notches 17 cut into this wing tip edge 14, these staggered notches being covered over by a transparent plastic 18 of suitable material faired into this tip edge of the wing and secured thereto as by removable fastenings 20. Mounted within the side walls 19 of each notch 17 is a lamp socket 21 and 22, each of which are provided with suitable electrical conduits 23 and 24, extending through the wing of the aircraft to the aircraft instrument board.

The preferred type of lamp bulb, mounted in these lamp sockets 21 and 22, is the lamp bulb 25 shown in Fig. 3, this lamp bulb being the same as that shown in the patent to Grimes, 2,237,072, except that in this case the bulb itself is colored and transparent instead of being clear and transparent. The lamps 25 placed in the port installation 11 are red, while those placed in the starboard installation 12 are green.

As shown in the above-mentioned patent, the transparent portion of the lamp is that at 26, while the remainder of the lamp is covered with a reflecting surface, as at 27, so as to concentrate the light in the proper area as called for by the usual safety regulations. As a result of the plurality of lamps 25 present in the installation 11, a greater degree of illumination is provided and, if desired, one or more additional staggered notches and lamps may be provided, thus increasing the illumination present. Obviously, with speeds ranging into 300 and 400 miles per hour, it is desirable that the running lamps give off greater amount of illumination so that aircraft traveling in opposite directions will become visible to each other at greater distances, enabling them to more easily avoid collisions with each other. However, high speeds are possible only with properly designed aircraft and the installation just described avoids any interference with the proper designing and efficiency of the aircraft.

The lamps shown at 30 in Fig. 4 are an old conventional type of running light, but even these may be arranged in the staggered relation as shown so as to increase the amount of illumination in the type of aircraft to which these running lights 30 are conventionally applied. This refers particularly to slow speed aircraft, where space and weight limitations are not so vital as they are in high speed aircraft, but where it is still desirable to provide more illumination than is possible with the use of a running light installation having but a single lamp therein.

Other modifications and changes in the number and proportions of the parts may be made by those skilled in the art without departing from the nature of this invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

A running light installation on the leading wing tip of an aircraft comprising a plurality of notched recesses providing side walls in staggered relation to each other, said side walls being in parallel planes, identically directed lamp sockets located in said recessed side walls in staggered relation to each other, running light lamps mounted in said lamp sockets to thereby emit light rays in identical directions, and a transparent member faired into the wing tip over the running light lamps.

JOHN M. ROPER.